United States Patent [19]
Czirr et al.

[11] Patent Number: 5,483,062
[45] Date of Patent: Jan. 9, 1996

[54] PHOTON DETECTOR BASED UPON AN ACTIVATED LANTHANIDE BERYLLATE SCINTILLATOR

[75] Inventors: John B. Czirr, Mapleton; Manuel Berrondo, Orem, both of Utah

[73] Assignee: Merrill Corporation, Salt Lake City, Utah

[21] Appl. No.: 184,147

[22] Filed: Jan. 21, 1994

[51] Int. Cl.$^6$ .............................. G01V 5/04; G01T 1/202
[52] U.S. Cl. .................... 250/256; 252/301.4 R
[58] Field of Search ............... 252/301.4 R; 250/256

[56] References Cited

U.S. PATENT DOCUMENTS

| | | | |
|---|---|---|---|
| 3,866,142 | 2/1975 | Cline et al. | 331/94.5 |
| 3,983,051 | 9/1976 | Cline et al. | 252/301.4 R |
| 4,277,303 | 7/1981 | Swinehart | 156/616 R |
| 4,486,684 | 12/1984 | Hohn | 313/336 |
| 4,647,781 | 3/1987 | Takagi et al. | 250/483.1 |
| 4,713,820 | 12/1987 | Morris et al. | 372/41 |
| 5,008,067 | 4/1991 | Czirr | 376/159 |
| 5,015,860 | 5/1991 | Moses | 250/361 R |
| 5,313,504 | 5/1994 | Czirr | 376/153 |

OTHER PUBLICATIONS

"Lanthanum beryllate: A new rare–earth ion laser host," Morris et al., Applied Physics Letters, vol. 27, No. 8 15 Oct. 1975, pp. 444–445.

"Spectroscopic properties and laser performance of $Nd^{3+}$ in lanthanum beryllate," Jenssen et al., Journal of Applied Physics, vol. 47, No. 4, Apr. 1976, pp. 1496–1500.

"Multiphonon relaxation of rare–earth ions in beryllium–fluoride glass," Layne et al., Physical Review B, vol. 16, No. 7, 1 Oct. 1977, pp. 3259–3261.

"The Crystal Structure of $La_2Be_2O_5$," Harris et al., Acta Cryst. (1968). B24, pp. 672–682.

"Cathodoluminescence of $Ce:La_2Be_2O_5$ Single Crystals," Gualtieri, Applied Physics Laboratory, ICL'93 (Draft Version), pp. 1–10.

"X–ray luminescence of lanthanum beryllate," Maslakov et al., Chemical Abstracts, vol. 98, 1983, p. 536.

"Scintillation effects in oxide crystalline phosphors," Viktorov et al., 71–Nuclear Technology, vol. 99, 1983, p. 503 (with copy of entire article in Russian and English translation of entire article).

*Primary Examiner*—Constantine Hannaher
*Attorney, Agent, or Firm*—Foley & Lardner

[57] ABSTRACT

A photon detector includes an activated lanthanide beryllate crystal, such as activated lanthanum beryllate, as a scintillator to detect photons. In one embodiment, the lanthanide beryllate crystal is doped with cerium.

27 Claims, 1 Drawing Sheet

PHOTON DETECTOR BASED UPON AN ACTIVATED LANTHANIDE BERYLLATE SCINTILLATOR

BACKGROUND OF THE INVENTION

The invention is directed toward a photon detector. More particularly, the invention is directed to an improved photon detector which uses an activated lanthanide beryllate, such as activated lanthanum beryllate, as a scintillation material. The term "photon" as used herein includes both gamma rays and X-rays.

Photon detectors are used in a wide variety of applications, for example, oil exploration and medicine. Photon detectors usually employ specially grown scintillation crystals which produce a flash of visible or near-visible photons when a high-energy photon interacts with electrons in the crystal. This flash of visible or near-visible photons is then sensed, for example, in a photomultiplier tube (PMT) which is adjacent to the scintillation crystal and the PMT produces an electrical signal indicative of the flash intensity. The electrical signals are then analyzed.

For example, in subsurface surveying applications a probe, or sonde, is drawn through a borehole and a photon detector in the sonde measures the energy and/or intensity of radiation returning from the strata. Oil, gas, water, and various other geological formations possess distinctive radiation signatures that permit identification of the make-up of the strata. Analysis of the time and energy spectrum distributions of detected high-energy photons thus provides information about subsurface conditions.

General background information on subsurface surveying is provided in U.S. Pat. No. 5,008,067, issued to John B. Czirr on Apr. 16, 1991 and entitled "Method of Downhole Neutron Monitoring" and U.S. Pat. No. 5,313,504, issued to John B. Czirr on May 17, 1994 and entitled "Neutron and Photon Monitor for Subsurface Surveying" The entire contents of these documents are incorporated herein by reference.

Two well known scintillation materials are bismuth germanate (BGO) and cerium fluoride ($CeF_3$). These two materials have certain drawbacks, however, relating to their decay time, ability to operate effectively at high temperatures, and light emission efficiency. For example, bismuth germanate does not scintillate at the high temperatures frequently encountered downhole.

SUMMARY OF THE INVENTION

It is an object of the invention to provide an improved photon detector.

Another object of the invention is to provide a scintillation material for photon detection which has a shorter decay time, an ability to operate more effectively at high temperatures, and improved light emission.

According to the invention, there is provided a photon detector having a scintillator for the detection of photons. The scintillator employs an activated lanthanide beryllate crystal, such as activated lanthanum beryllate ("BEL"), as a scintillating material. The lanthanide beryllate crystal can be doped with cerium.

Other objects, features, and advantages of the invention will be apparent from the detailed description set forth below.

BRIEF DESCRIPTION OF THE DRAWING

The invention will be described in detail below with reference to the accompanying drawing, wherein.

DETAILED DESCRIPTION OF VARIOUS EMBODIMENTS

Figure 1:
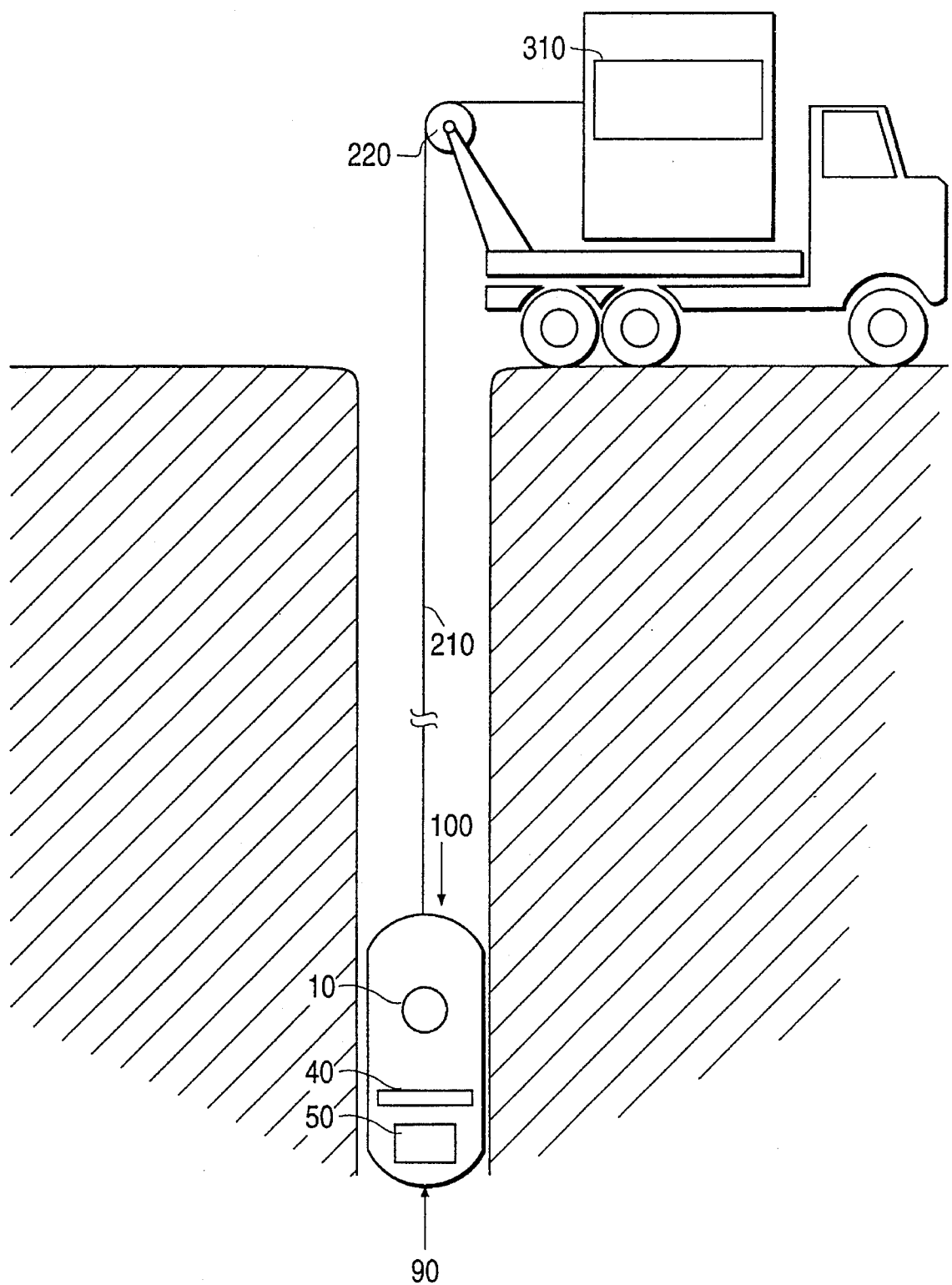
FIG. 1 illustrates an example of an application of the instant invention.

It has been discovered that an activated lanthanide beryllate, such as activated lanthanum beryllate ("BEL") $La_2Be_2O_5$, is particularly well-suited for use as a scintillator for photon detection. Other suitable activated lanthanide beryllates include activated gadolinium beryllate $Gd_2Be_2O_5$ and activated lutetium beryllate $Lu_2Be_2O_5$.

The lanthanide beryllate is activated, for example, by doping it with cerium (Ce). When activated by cerium the ratio (by mole fraction) of cerium to lanthanide is between $10^{-4}$ and 100% (i.e., cerium beryllate), and preferably between $10^{-4}$ and 10%.

Laboratory testing was performed using a sample of activated BEL having a 4,850:1 lanthanum to cerium ratio. The crystal was prepared using the Czochralski technique. The grown crystal was annealed at 1070° C. for three hours in a 5% $H_2$ in argon atmosphere to improve the light output. This crystal of Ce-activated lanthanum beryllate was tested for its gamma detection properties. The density (6.1 gm/cm$^3$) and decay time (50 ns) compare favorably with other recently developed materials. The scintillation efficiency for this test sample was 58% that of BGO, using a $^{137}Cs$ gamma source. For an excitation wavelength of 340 nm, the emission spectrum is a broad peak centered at 450 nm. The $H_2$ annealed sample is transparent for wavelengths greater than 400 nm. The scintillation efficiency can be significantly improved by varying the crystal growth conditions (e.g., by growing the crystal in a partial $H_2$ atmosphere) and increasing the concentration of cerium. When activated by cerium the ratio (by mole fraction) of cerium to lanthanum in the BEL is between $10^{-4}$ and slightly less than 100%, and preferably between $10^{-4}$ and 10%.

Activated BEL has a shorter decay time than BGO and also scintillates better at high temperatures. Thus, a photon detector designed in accordance with the instant invention is faster and also operates better at high temperatures. In addition, the activated BEL emits more light than cerium fluoride.

FIG. 1 illustrates an example of an application of the instant invention. FIG. 1 illustrates a logging sonde 100 which includes a neutron source 10 for emitting high energy neutrons into a subsurface formation and a photon detector 50 for detecting photons resulting from the bombardment of the subsurface formation with the high energy neutrons. The sonde 100 includes a pressure casing 90 which protects equipment inside the sonde from the borehole environment. A shield 40 shields the photon detector 50 from the neutron source 10.

The sonde 100 is suspended in a borehole by an armored multi-conductor cable 210. The operation of the sonde 100 is controlled from the surface by signals sent downhole via cable 210. The sonde 100 is moved within the borehole by paying cable 210 out and reeling it back in over a wheel 220.

The photon detector 50 detects high-energy photons returning from the strata. The photon detector 50 employs cerium-activated BEL as a scintillator for photon detection, in accordance with the instant invention.

Although the invention is described above with respect to certain embodiments and applications, the scope of the invention is not limited to the specific embodiments and applications described above. Variations and modifications will be apparent to those skilled in the art after receiving the teachings of the above disclosure. For example, the lanthanide beryllate materials described above can also be used for the detection of other nuclear particles such as alpha and beta particles and can be used in photon detection applications other than downhole applications, for example medical applications and particle experiments. In certain applications the scintillator may be doped with praseodymium (Pr). Therefore, the scope of the invention is defined with reference to the following claims.

What is claimed is:

1. A gamma ray detector comprising:
   an activated lanthanide beryllate crystal scintillator to detect gamma rays.

2. A gamma ray detector as set forth in claim 1 wherein the lanthanide beryllate crystal is doped with cerium.

3. A gamma ray detector as set forth in claim 1 wherein the lanthanide beryllate crystal is doped with praseodymium.

4. A gamma ray detector as set forth in claim 1 wherein the lanthanide beryllate crystal is cerium beryllate.

5. A gamma ray detector as set forth in claim 1 wherein the lanthanide beryllate crystal is gadolinium beryllate.

6. A gamma ray detector as set forth in claim 1 wherein the lanthanide beryllate crystal is lutetium beryllate.

7. A gamma ray detector comprising: an activated lanthanum beryllate crystal scintillator to detect gamma rays.

8. A gamma ray detector as set forth in claim 7 wherein the lanthanum beryllate crystal is doped with cerium.

9. A gamma ray detector as set forth in claim 7 wherein the lanthanum beryllate crystal is doped with praseodymium.

10. An apparatus to survey subsurface formations, the apparatus comprising:
    (a) a sonde configured to move through a borehole; and
    (b) an activated lanthanum beryllate crystal scintillator gamma ray detector to detect gamma rays coming from the subsurface formations.

11. An apparatus as set forth in claim 10 wherein the lanthanum beryllate crystal is doped with cerium.

12. An apparatus as set forth in claim 10 wherein the lanthanum beryllate crystal is doped with praseodymium.

13. An X-ray detector comprising:
    an activated lanthanide beryllate crystal scintillator to detect X-rays.

14. An X-ray detector as set forth in claim 13 wherein the lanthanide beryllate crystal is doped with cerium.

15. An X-ray detector as set forth in claim 13 wherein the lanthanide beryllate crystal is doped with praseodymium.

16. An X-ray detector as set forth in claim 13 wherein the lanthanide beryllate crystal is cerium beryllate.

17. An X-ray detector as set forth in claim 13 wherein the lanthanide beryllate crystal is gadolinium beryllate.

18. An X-ray detector as set forth in claim 13 wherein the lanthanide beryllate crystal is lutetium beryllate.

19. An apparatus to survey subsurface formations, the apparatus comprising:
    (a) a sonde configured to move through a borehole; and
    (b) an activated lanthanum beryllate crystal scintillator X-ray detector to detect X-rays coming from the subsurface formations.

20. An apparatus as set forth in claim 19 wherein the lanthanum beryllate crystal is doped with cerium.

21. An apparatus as set forth in claim 19 wherein the lanthanum beryllate crystal is doped with praseodymium.

22. An X-ray detector comprising:
    an activated lanthanum beryllate crystal scintillator to detect X-rays.

23. An X-ray detector as set forth in claim 22 wherein the lanthanum beryllate crystal is doped with cerium.

24. An X-ray detector as set forth in claim 22 wherein the lanthanum beryllate crystal is doped with praseodymium.

25. An apparatus to survey subsurface formations, the apparatus comprising:
    (a) a sonde configured to move through a borehole; and
    (b) an activated lanthanum beryllate crystal scintillator photon detector to detect photons coming from the subsurface formations.

26. An apparatus as set forth in claim 25 wherein the lanthanum beryllate crystal is doped with cerium.

27. An apparatus as set forth in claim 25 wherein the lanthanum beryllate crystal is doped with praseodymium.

* * * * *

UNITED STATES PATENT AND TRADEMARK OFFICE
CERTIFICATE OF CORRECTION

PATENT NO. : 5,483,062
DATED : January 9, 1996
INVENTOR(S) : John B. CZIRR et al.

It is certified that error appears in the above-indentified patent and that said Letters Patent is hereby corrected as shown below:

Please cancel claims 13-24, appearing at column 4, lines 3-32.

Signed and Sealed this

Fourth Day of March, 1997

Attest:

BRUCE LEHMAN

*Attesting Officer*     *Commissioner of Patents and Trademarks*